VARIABLE WIDTH PULSE GENERATOR

Filed Jan. 18, 1966

INVENTOR
W. B. HARRIS
BY
Lucian C. Canepa
ATTORNEY

United States Patent Office 3,396,293
Patented Aug. 6, 1968

3,396,293

VARIABLE WIDTH PULSE GENERATOR

William B. Harris, Bernardsville, N.J., assignor to Bell Telephone Laboratories Incorporated, New York, N.Y., a corporation of New York Filed Jan. 18, 1966, Ser. No. 521,306
9 Claims. (Cl. 307—268)

Figure 1:
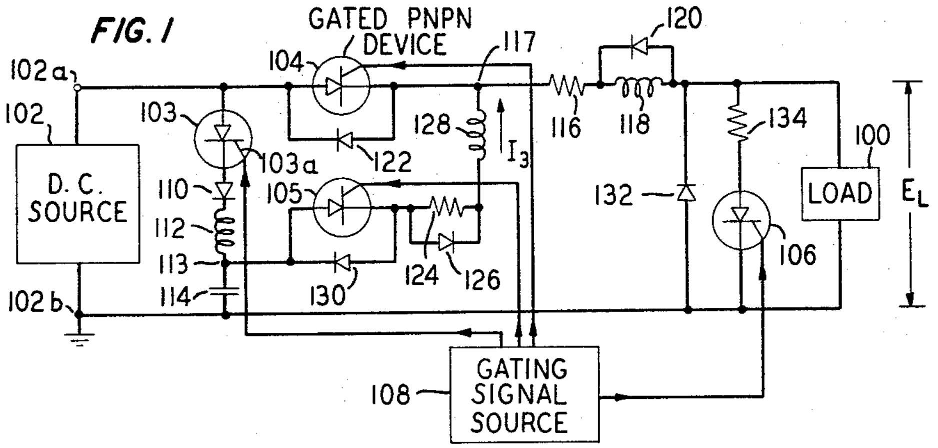

This invention relates to pulse generators and more particularly to an improved pulse generator of the type that supplies variable width output pulses.

In my copending application, Ser. No. 370,934, filed May 28, 1964, now Patent No. 3,359,498, issued Dec. 19, 1967, there are disclosed various pulse generating circuits capable of providing pulses of variable width or duration. The circuits disclosed there comprise two basic types which are both needed to cover a complete output pulse width range that extends from near zero to an almost 100% duty cycle.

An object of the present invention is the improvement of pulse generating circuits of the general type disclosed in the afore-identified application.

More specifically, an object of this invention is a single general purpose circuit capable of generating pulses whose widths are variable over a range that extends from near zero to an almost 100% duty cycle.

Another object of the present invention is a reliable pulse generating circuit whose overall organization is characterized by versatility and simplicity of design.

These and other objects of the present invention are realized in a specific illustrative embodiment thereof which comprises four gated switching devices which are arranged and controlled to provide variable width output pulses from a single direct-current supply source. In response to selective sequential operation of the devices, there are provided output pulses whose widths are easily variable over a range that extends from near zero to an almost 100% duty cycle.

In a first mode of operation characteristic of the invention, the single general purpose embodiment is controlled to generate pulses whose widths are variable from near zero to an interval that corresponds approximately to the reverse recovery time of the switching devices included therein. In a second mode of operation, the same circuit provides output pulses whose widths are variable over a range that extends from the noted recovery time to an arbitrarily long interval.

Briefly, the illustrative circuit comprises a first switching device which is adapted to control the resonant charging of a capacitor to a voltage that exceeds that of the direct-current supply source. Both modes of operation of the circuit are initiated by activation of this first device. A series arrangement comprising a second switching device, a junction point, an inductor and a load is connected across the direct-current source. Another series arrangement comprising a third switching device and an inductor is connected between the junction point and one plate of the capacitor. A fourth switching device is connected in parallel with the load.

In the first mode of operation, an output pulse is initiated by activating the third device thereby to connect the charged capacitor to the load. The magnitude of the voltage appearing across the load is clamped at the value of the supply voltage by a diode connected in shunt with the second device, thus permitting the supply to furnish the load current. In turn, the output pulse is terminated by activating the fourth device, whereby the load is short-circuited and a bipolar ringing cycle is initiated. The ringing cycle is effective to deenergize the third and fourth devices. Subsequent activation of the first device reestablishes the requisite charge on the capacitor and readies the circuit for another cycle of operation of either mode.

In the second mode of operation, an output pulse is initiated by activating the second device thereby to connect the direct-current source to the load. At any arbitrary time later the pulse may be terminated. This is accomplished by activating the third device approximately one recovery time prior to the desired termination time and, in addition, by activating the fourth device at the desired termination time. Initial activation of the third device causes the second device to be deactivated. An ensuing ringing cycle, initiated by activation of the fourth or load-shorting device, causes both the third and fourth devices to be subsequently deenergized.

Thus, in accordance with the principles of the present invention, there is provided a single general purpose circuit whose mode of operation can be easily controlled by applying thereto properly-timed gating signals to generate output pulses whose widths are continuously variable over a wide range.

It is a feature of the present invention that a pulse generator comprise a plurality of controlled switching devices that are connected between a single direct-current supply source and a load, that the device be activated in a predetermined sequence by gating signals applied thereto, and that the devices be automatically deactivated in response to the flow of a ringing cycle current through the circuitry of the generator, whereby output pulses are provided whose widths are continuously variable over a range that extends from near zero to an almost 100% duty cycle.

Figure 2A:
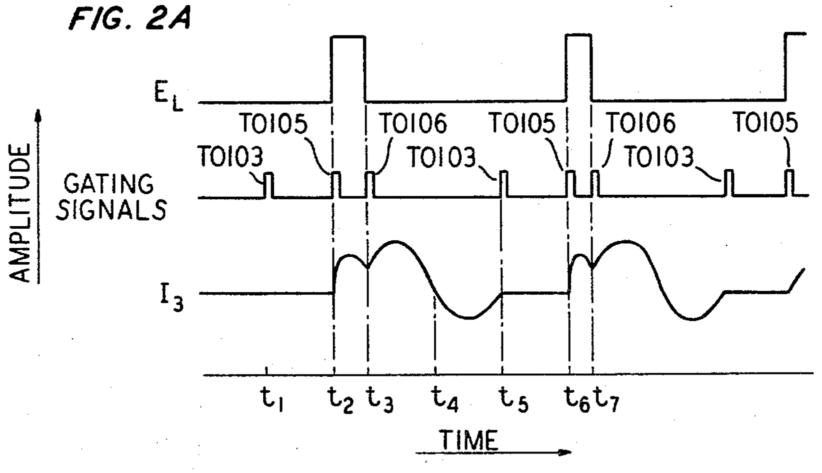
Figure 2B:
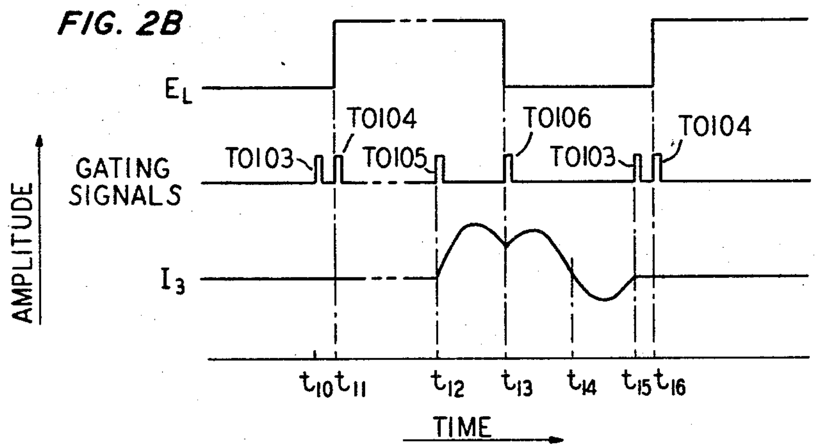

A complete understanding of the present invention and of the above and other objects, features and advantages thereof may be gained from a consideration of the following detailed description of a specific illustrative embodiment thereof presented hereinbelow in connection with the accompanying drawing, in which:

FIG. 1 shows a specific illustrative general purpose pulse generating circuit made in accordance with the principles of the present invention; and FIGS. 2A and 2B respectively depict waveforms characteristic of the two modes of operation of the circuit shown in FIG. 1.

The circuit illustrated in FIG. 1 is adapted to supply unipolar pulses of variable duration to a load 100. The circuit is powered by a direct-current source 102 and is selectively controlled by signals supplied to four ON-OFF switching elements 103 through 106 by a gating signal source 108. Illustratively, the elements 103 through 106 comprise conventional gated PNPN devices which are also commonly referred to as silicon controlled rectifiers. As is well known, such a device may be switched to its ON or relatively low impedance state by applying a control signal of the proper polarity to the gate electrode thereof. An activated device may be de-energized by applying a reverse voltage between its anode and cathode electrodes. This reverse voltage must be maintained across the device for at least the characteristic reverse recovery time thereof which, in the case of a PNPN device, is more commonly referred to as the forward blocking recovery time. If the reverse voltage is not maintained for at least this time, the device may turn ON again (even in the absence of a gating signal) when a forward voltage is reestablished thereacross.

The anode of the first device 103 shown in FIG. 1 is connected to the upper terminal 102*a* of the source 102. Illustratively, the terminal 102*a* is maintained at a positive voltage with respect to a lower terminal 102*b* which may, for example, be connected to a point of reference potential such as ground. The cathode of the device 103 is connected to a conventional asymmetrically conducting diode 110 which is poled in a series-aiding relationship with respect to the device 103. In turn, the diode 110 is connected in series with an inductor 112 and a capacitor 114. The device 103 may be turned ON by applying to the gate electrode 103a thereof a positive control signal from the gating source 108.

The second device 104 is poled in the forward direction with respect to the direct-current source 102. The device 104 is connected in series with a resistor 116, a parallel network comprising an inductor 118 and a diode 120, and the load 100. Another diode 122 is connected between the anode and cathode electrodes of the device 104.

The third device 105 shown in FIG. 1 is connected in a series arrangement which comprises a parallel network including a resistor 124 and a diode 126, and an inductor 128. A diode 130 is connected across the device 105. In turn, the noted series arrangement is connected between a junction point 113, which is between the inductor 112 and the capacitor 114, and a junction point 117 which is between the device 104 and the resistor 116.

In addition, a diode 132 is connected in parallel with the load 100. The fourth device 106, in series with a resistor 134, is also connected in parallel with the load 100.

The specific circuit shown in FIG. 1 is designed to drive either a resistive or a capacitive load. The elements 116, 118, 120 and 134 thereof are needed only in the case of a capacitive load. Hence, if only resistive loads are to be supplied with variable width pulses, the elements 116, 118, 120 and 134 may be omitted from the depicted circuit.

To initiate a cycle of operation of the illustrative circuit shown in FIG. 1, a gating signal is applied only to the device 103. Activation of the device 103 completes a resonant charging path for the capacitor 114, whereby the capacitor 114 is charged to a positive voltage (top plate with respect to the bottom plate) which approaches twice the voltage of the source 102. The diode 110 blocks the resonant transfer of charge from the capacitor 114 upwards through the inductor 112. As a result, the capacitor retains thereon the afore-specified positive voltage. Additionally, as the current flowing in the noted charging path decreases to a point below the minimum current necessary to sustain conduction in the device 103, the device 103 is automatically turned OFF or deactivated.

At this point a distinction must be made between relatively narrow and relatively wide output pulses to be delivered to the load 100. Relatively narrow pulses are supplied to the load 100 during what is referred to herein as the first mode of operation of the illustrative circuit. Relatively wide pulses are supplied thereto during a second mode of operation. A relatively narrow pulse is defined herein as one whose width extends over a range from near zero (determined by the rise time characteristics of the circuit) to an interval that approximates the forward blocking recovery time of the devices 103 through 106. On the other hand, a relatively wide pulse is one whose duration is greater than the reverse recovery time by any arbitrary amount.

The waveforms shown in FIG. 2A are illustrative of the first mode of operation of the FIG. 1 circuit. The previously-mentioned gating signal applied to the first device 103 is represented in FIG. 2A as occurring at time $t_1$. The next gating signal, to be applied to the third device 105, is not supplied by the gating signal source 108 until the first device 103 has been deactivated for at least its forward blocking recovery time. Accordingly, the time designated $t_2$ in FIG. 2A is assumed to occur sufficiently long after $t_1$ to insure that the device 103 will not be turned ON in response to the subsequent energization of the device 105.

At the time designated $t_2$ in FIG. 2A, a gating or energizing signal is applied by the source 108 to the third controlled device 105. Energization of the device 105 causes the appearance across the load 100 of a rising voltage whose waveform is determined by the elements 114, 128, 116, 118 and the load 100. Initially, the current supplied by the capacitor 114 flows through the diode 126 and the inductor 128. (The current flowing through the inductor 128 is designated $I_3$ in FIGS. 1, 2A and 2B.) Additionally, the noted initial current flows through the resistor 116, the inductor 118 and the load 100.

In response to the energization of the device 105, the voltage with respect to ground of the junction point 117 rises in value. When the voltage thereof slightly exceeds the voltage of the terminal 102a of the source 102, the diode 122 is forward-biased and thereby rendered conductive. This action serves to clamp the load voltage $E_L$ at a value that approximates that of the source 102. Subsequent to the energization of the diode 122, current is applied to the load 100 from the source 102 via the diode 122. Also, subsequent to the energization of the diode 122, a resonant or ringing cycle ensues. The ringing current flows from the capacitor 114, through the device 105, the diode 126, the inductor 128, the diode 122 and the source 102. For reasons that will be evident from the description hereinbelow of the relatively wide pulse case, the half-period of this resonant cycle is selected to approximate the forward blocking recovery time of the switching devices 103 through 106.

At a subsequent time $t_3$ (FIG. 2A) a gating signal is supplied by the source 108 to the fourth switching device 106. This signal is controlled to occur at any desired time subsequent to $t_2$ up to a maximum interval thereafter which approximates the half-period of the noted resonant cycle. Energization of the load shorting device 106 causes $E_L$ to fall abruptly to a relatively low level thereby (as indicated in FIG. 2A) terminating the variable width output pulse delivered to the load 100.

Activation of the device 106 occurs at a time ($t_3$) when the capacitor 114 has an appreciable charge thereon. The result of the shorting action of the device 106 is to cause a ringing current cycle to occur. The positive portion of this cycle occurs in the interval $t_3$–$t_4$. During this portion of the cycle, the current that formerly flowed through the load 100 is carried instead by the relatively low impedance shunt path that includes the resistor 134 and the device 106.

In the interval designated $t_4$–$t_5$ in FIG. 2A, current flows from the bottom plate of the capacitor 114 through the diodes 132 and 120, through the resistor 116, the inductor 128, the resistor 124 and the diode 130. The resulting voltage drops across the diodes 130 and 132 are effective, immediately subsequent to $t_4$, to automatically turn OFF the switching devices 105 and 106, respectively. The devices 105 and 106 are therefore maintained in their deactivated states for an interval that approximates their forward blocking recovery times. Hence another complete cycle of operation of the illustrative pulse generator may be initiated, by activation of the first switching device 103, at any time after the termination of the negative half-cycle of the aforementioned ringing waveform. In FIG. 2A another such complete cycle of operation is represented as beginning at time $t_5$. Subsequent gating signals at times $t_6$ and $t_7$ respectively define the beginning and termination of another variable width output pulse of the narrow type.

The resistor 124 is included in the circuit of FIG. 1 to damp out the returning or negative half-cycle shown in the interval $t_4$–$t_5$ of FIG. 2A. In particular, the value of the resistor 124 is selected to reduce almost to zero the final voltage appearing across the capacitor 114 thereby to maintain at a maximum value the amount of load current that can be switched in the manner specified above. Typically, the value of the resistor 124 is chosen to be about one-half the value that the associated critical damping resistor would be.

It is apparent from FIG. 2A and the discussion hereinabove that the minimum interpulse interval characteristic of the so-called first mode of operation is approximately three reverse recovery times. A complete ringing cycle consumes about two of these times and an additional such time must be allowed subsequent to the deactivation of the first device 103 before gating the third device 105.

It is also apparent that a complete switching cycle in the first mode of operation does not involve activation of the second device 104. Hence no gating signals are applied to the device 104 during such operation. On the other hand, in the second mode of operation, to be described in detail hereinbelow, all four switching devices 103 through 106 are gated or activated in a prescribed sequence.

The waveforms shown in FIG. 2B are illustrative of the second mode of operation of the FIG. 1 circuit. As before, the first device 103 is activated by a gating signal from the source 108 to initiate a switching cycle. Such activation is represented in FIG. 2B as occurring at time $t_{10}$. The next gating signal from the source 108, to be applied to the second device 104, may occur at any time thereafter. In other words, it is not necessary, as it was in the case represented by FIG. 2A, to delay the application of the next gating signal for at least the forward blocking recovery time of the device 103. Hence the minimum interpulse interval in the second mode of operation can be less than that specified above for the first mode of operation.

The gating signal applied to the device 103 at time $t_{10}$ causes the capacitor 114 of FIG. 1 to resonantly charge to a voltage which approaches twice that of the source 102. Thereafter, at the time designated $t_{11}$ in FIG. 2B, the output pulse is initiated by applying a gating signal from the source 108 to the second switching device 104. In the case of a resistive load (and without the components 116, 118 and 120) the output or load voltage almost immediately attains a voltage whose value is less than the voltage of the source 102 only by the relatively small drop appearing across the energized device 104.

In the case of a capacitive load, the components 116, 118 and 120 are advantageously included in the FIG. 1 circuit. The inductor 118 and the capacitive load itself form a resonant charging circuit which causes the voltage across the load to rise more gradually than it does when the load is resistive. Eventually the load voltage $E_L$ slightly exceeds the voltage of the source 102. At that point the diode 120 becomes forward-biased and is rendered conductive, whereby the inductor 118 is short-circuited and the load voltage is clamped at approximately the voltage of the source 102.

Due to the presence of the resistor 116, the aforementioned resonant charging of the capacitive load is slightly under-damped. This serves to minimize oscillatory ripple arising from stray inductance in the leads of the circuitry. As a result, the waveform of the output voltage pulse is more flat-topped than it would be without the resistor 116.

Subsequent to time $t_{11}$ (FIG. 2B) the load voltage $E_L$ remains essentially constant at the depicted relatively high level. This relatively high level may be maintained for any arbitrarily long time interval. Assume that finally, at time $t_{13}$, it is desired to terminate the pulse that started at $t_{11}$. To accomplish this, the third switching device 105 is gated ON at time $t_{12}$ via a signal from the source 108. This occurs approximately one forward blocking recovery time prior to $t_{13}$. Activation of the device 105 completes a path for the resonant discharge of the capacitor 114. The capacitive discharge current flows through the following elements in order: the diode 126, the inductor 128, the diode 122 and the source 102. The resulting voltage appearing across the diode 122 causes the second device 104 to be deactivated. However, load current continues to be supplied from the source 102 to the load 100 via the conducting diode 122.

At the time ($t_{13}$) at which termination of the pulse shown in FIG. 2B is desired, the fourth or load switching device 106 is gated on by a signal from the source 108. Besides terminating the pulse, this shorting action initiates a ringing cycle of operation of the type described above in connection with the generation of relatively narrow pulses. The second device 104 is not reactivated at this time because it had been maintained OFF during the period $t_{12}$–$t_{13}$ for a full forward blocking recovery time. At approximately $t_{14}$, the devices 105 and 106 are automatically deactivated. The devices 105 and 106 are held deactivated during their forward blocking recovery times by the voltages which appear across the diodes 130 and 132 during the interval $t_{14}$–$t_{15}$. At $t_{15}$, or at any desired time thereafter, another complete pulse generating cycle may commence.

As mentioned above, the resistor 134 is advantageously included in the FIG. 1 circuit if the load thereof is capacitive in nature. The resistor 134 serves to limit the peak current that flows through the fourth device 106 when the load 100 is short-circuited. In this way, damage to the device 106 arising from high currents flowing therethrough is effectively guarded against.

Thus, there has been described herein in detail a single general purpose circuit capable of generating pulses whose widths are continuously variable over a range that extends from near zero to an almost 100% duty cycle. Operation of the circuit is selectively controlled by the sequential application of properly-timed gating signals to four switching devices included therein. Turn-off of the devices is designed to occur automatically at specified times following activation thereof.

It is to be understood that the above-described arrangements are only illustrative of the application of the principles of the present invention. In accordance with these principles, numerous other arrangements may be devised by those skilled in the art without departing from the spirit and scope of the invention.

What is claimed is:

1. In combination in a variable width pulse generator,
a direct-current source,
a first series arrangement comprising a first controlled switch and a capacitor, said first arrangement having a junction point between said first switch and said capacitor,
means connecting said first arrangement across said source,
a second series arrangement comprising a second controlled switch and a load, said second arrangement including a junction point between said second switch and said load,
means connecting said second arrangement across said source,
a third series arrangement comprising a third controlled switch and an inductor,
means connecting said third arrangement between said junction points,
means including a fourth controlled switch connected across said load,
and timing means connected to said switches for selectively controlling the activation states thereof to supply variable width pulses to said load.

2. A combination as in claim 1 wherein each of said four controlled switches comprises a gated PNPN device.

3. A cambination as in claim 2 wherein said first series arrangement further includes an inductor and a diode connected between said first-mentioned junction point and said first device, said diode being connected in series aiding with said first device, whereby activation of said first device causes unidirectional resonant charging of said capacitor.

4. A combination as in claim 3 wherein each of said second, third and fourth devices has an individual diode connected in parallel therewith and poled in opposition thereto.

5. A combination as in claim 4 further including a first network connected in series with said third device, said first network comprising a damping resistor connected in parallel with a diode that is connected in series aiding with said third device.

6. A combination as in claim 5 further including a second network connected between said second device and said load, said second network comprising a ripple suppression resistor connected in series with a parallel arrangement of an inductor and a diode which is poled in opposition to said second device.

7. In combination in a pulse generator,
a direct-current source,
a load,
a capacitor,
first controlled means connected to said source for resonantly charging said capacitor to a voltage that exceeds that of said source,
second controlled means connected in series with said source and said load,
third controlled means for applying the voltage across said capacitor to said second means,
and fourth controlled means connected across said load and adapted to be energized to define the termination of an output pulse.

8. A combination as in claim 7 wherein said second means comprises a diode connected in opposed shunt relationship with a gated PNPN device that is adapted to be activated to define the initiation of a relatively wide output pulse to be delivered to said load, and wherein the application of the voltage across the capacitor to said second means is effective to deactivate said PNPN device for at least the reverse recovery time thereof, and further including timing means for applying activating signals in respective sequence to said first through fourth means.

9. A combination as in claim 7 wherein said second means comprises a diode connected in series opposition with said fourth means and wherein said third means is adapted to be activated to define the initiation of a relatively narrow output pulse to be delivered to said load, and further including timing means for applying activating signals in respective sequence to only said first, third and fourth means.

No references cited.

ARTIUR GAUSS, *Primary Examiner.*

J. ZAZWORSKY, *Assistant Examiner.*